United States Patent [19]

Dannecker et al.

[11] Patent Number: 5,199,761
[45] Date of Patent: Apr. 6, 1993

[54] SIDE WINDOW FOR A MOTOR VEHICLE

[75] Inventors: Herbert Dannecker, Boblingen; Franz Waldhauser, Sindelfingen; Günter Kling, Böblingen, all of Fed. Rep. of Germany

[73] Assignee: Mercedes-Benz AG, Fed. Rep. of Germany

[21] Appl. No.: 843,055

[22] Filed: Mar. 2, 1992

[30] Foreign Application Priority Data

Mar. 2, 1991 [DE] Fed. Rep. of Germany ....... 4106715

[51] Int. Cl.$^5$ ................................................ B60J 5/00
[52] U.S. Cl. ............................ 296/146 J; 296/146 K; 296/201; 49/475
[58] Field of Search ................ 296/146 J, 146 K, 201; 49/475, 479, 502; 52/208

[56] References Cited

U.S. PATENT DOCUMENTS 4,627,201 12/1986 Hamamoto et al. ................. 52/208
4,988,142 1/1991 Chandler et al. ................... 296/146
5,092,078 3/1992 Keys ................................. 296/201 X

FOREIGN PATENT DOCUMENTS 0242223 10/1987 European Pat. Off. .
2-225132 9/1990 Japan .

Primary Examiner—Robert R. Song
Attorney, Agent, or Firm—Evenson, Wands, Edwards, Lenahan & McKeown

[57] ABSTRACT

To overcome compensation problems of longitudinal tolerances of the window panes of a motor vehicle side window which is subdivided by a window web if double glass panes are provided and a sealing lip which engages over the outer surface of the window panes is not desired or not possible, it is provided for the sealing and holding profile of the window web facing the fixed window pane to be slidably arranged in a recess thereof and to be constructed as a profile part guided on a guide face provided in the recess. The profile can be mounted in the desired position by a screw.

7 Claims, 2 Drawing Sheets

SIDE WINDOW FOR A MOTOR VEHICLE

BACKGROUND AND SUMMARY OF THE INVENTION

The present invention relates to a side window for a motor vehicle, which is equipped with a fixed, in particular triangular window pane and with a window pane which can be lowered in the frame of the side window, and, more specifically, to a side window with a window web extending between the two window panes and provided with a window guide profile for the lowerable window pane and with a sealing and holding profile for the fixed window pane.

Side windows are known for the rear side doors of passenger vehicles. In such side windows, problems occurs that, due to tolerances of the lowerable window pane and of the fixed window pane in the longitudinal direction of the vehicle, these window panes may be given a different installation position in relation to the window web. Hitherto, it has been possible to compensate for this by letting in both the lowerable and the fixed window pane in sealing profiles which engage over the outside of the window pane with a lip in each case so that it was possible to compensate the longitudinal tolerances which occurred.

With the introduction of double-walled insulating glass panes, however, it was no longer possible to solve the existing problem readily in this manner because otherwise sealing profiles of a considerable width would be necessary and additionally the appearance of the vehicle would be adversely affected to an excessive degree if a lip were to engage over the outer of the two window panes. In addition, such sealing lips which cover the outer surface of the window panes also have the disadvantage that they can result in unpleasant wind noises during driving.

Therefore, the present invention has an object of providing a side window such that it is possible to compensate the longitudinal tolerances of the window panes without having to provide external sealing lips which cover the outer surfaces of the window panes.

This object has been achieved by providing in a window for the sealing and holding profile of the window web to be constructed as a profile part which can be slid in a recess of the window web. By virtue of this configuration, longitudinal tolerances can be easily compensated by varying the dimensions of the window web in its longitudinal direction. It becomes possible, in particular for insulating glass panes consisting of a double pane, to construct the outer wall of the outer window pane to be approximately flush with the outer surface of the side web. Disturbing wind noises due to externally protruding sealing lips are thus advantageously eliminated. The aesthetic appearance of the vehicle body is also improved.

Here, it is further advantageous in the window web which is adjustable per se in accordance with the present invention if the recess is provided with a guide face on which the slidable profile part is guided. In one embodiment, this guide face is advantageously arranged on a side of the recess facing the outside of the window so that on this side a particularly good guidance can be obtained, for which it is important to obtain a guidance which is flush with the outer surface of the outer or fixed side window pane.

This guide face can also advantageously be a longitudinal groove which is matched to the dimensions of a web protruding from the profile part and is arranged behind a side web which forms the termination of the recess. In this manner, the slidable profile part itself can also be provided with a groove-like depression which during adjustment is located above the outer edge of the side web. A compact arrangement is thus possible. The position of the slidable profile part can be fixed by a screw which engages through an elongated hole and is seated on the inside of the window.

In another embodiment of the present invention, the guide face can also be located on the inside of the window and be directly provided with an elongated hole which extends in the sliding direction of the profile part and through which a mounting part for the profile part engages. In a beneficial simple manner, this mounting part can be a screw which engages in a threaded bore of the profile part so that the longitudinal adjustment of the slidable profile part of the window web is possible during installation after the insertion of the fixed window pane part. The screw can be covered on the inside by a panelling part.

BRIEF DESCRIPTION OF THE DRAWINGS

These and other objects, features and advantages of the present invention will become more readily apparent from the following detailed description of currently preferred embodiments when taken in conjunction with the accompanying drawings wherein.

DETAILED DESCRIPTION OF THE DRAWINGS

Figure 1:
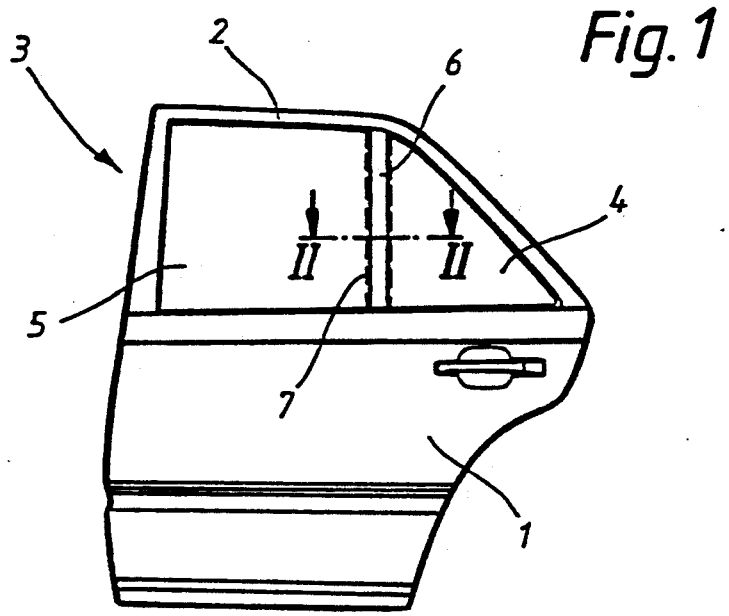
FIG. 1 is a side view of a rear side door of a passenger vehicle.

In FIG. 1, the rear door 1 of a limousine is provided with a frame 2 for the side window 3 which consists of a fixed, approximately triangular window pane 4 and a window pane 5 which can be lowered in the door 1. A window web 6 is arranged in the frame 2 between the two window panes 4, 5 and, on one hand, holds and secures the fixed window pane 4 in a sealed fashion and, on the other hand, is provided with a window guide profile 7 facing the lowerable window pane 5.

Figure 2:
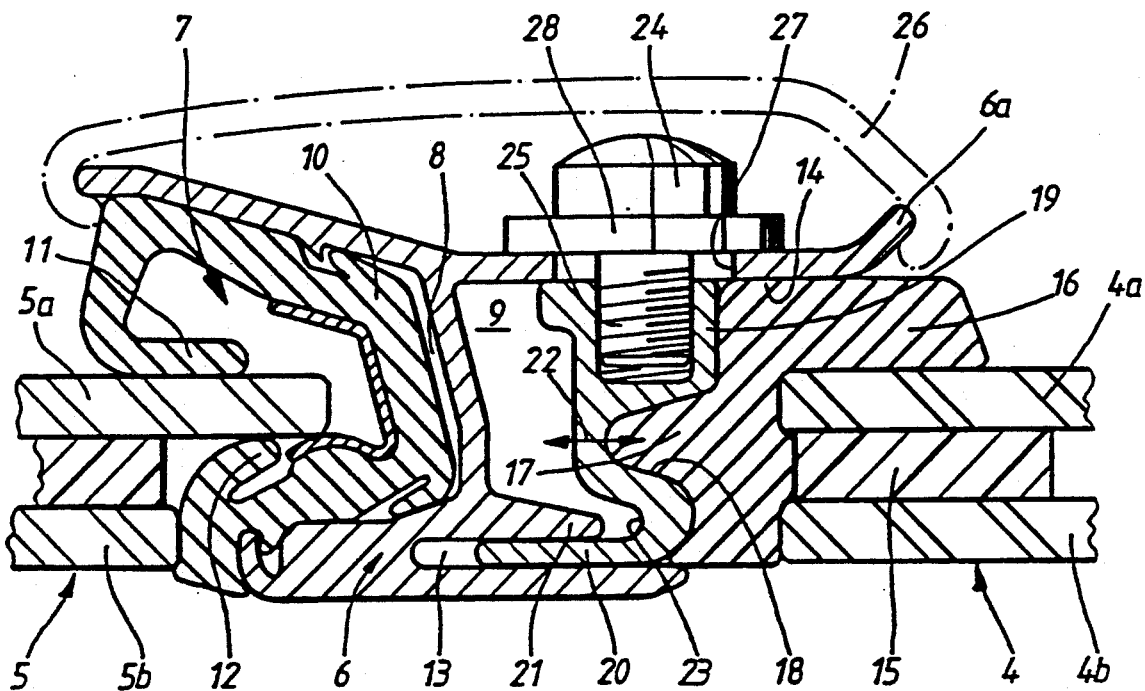
FIG. 2 is an enlarged cross-sectional view of the window web of the side door shown in along line II—II of FIG. 1.

As is clear from FIG. 2, the window web 6 consists of a fixed, approximately H-shaped profile which has U-shaped recesses 8, 9 on both sides. A rubber U-shaped sealing profile 10 is inserted into the recess 8 facing the lowerable insulating glass pane 5 consisting of the two window panes 5a, 5b and is constructed such that it rests against the inner window pane 5a of the insulating glass pane 5 with sealing lips 11, 12. The recess 8 is otherwise configured such that the inserted sealing profile 10 is held in this recess, although this design is not necessary for carrying out the present invention.

The window web 6 has a narrow but relatively deep longitudinal groove 13 on the outside in the other recess 9 which faces the fixed window part, and has on the opposite side, a guide face 14 which extends parallel or at least approximately parallel to the side faces of the fixed window pane 4 and parallel to the longitudinal groove 13. The fixed window pane 4 consists, as does the lowerable window pane 5, of two insulating glass panes 4a, 4b which are held together in parallel by a sealing and joint edge 15 and are held in a preferably injection-molded rubber or plastic profile 16 engaging in the intermediate space between the two window panes 4a, 4b and over the inner window pane 4a at the edge.

The profile 16 is flush on its outside with the outer surface of the outer window pane 4b, and it has a circumferential rounded-off beading 17 which engages in a rounded-off groove 18 of a slidable profile part 19 which engages with a web protruding from it into the longitudinal groove 13 of the window web 6. The longitudinal groove 13 is matched to the dimensions of the web 20 protruding from the profile part 19 and is arranged behind a side web 21 forming the termination of the recess 9. The slidable profile part 19 can be slid in the direction of the double arrows 22 within the recess 9 and is guided with its web 20 in the longitudinal groove 13 and with its outside opposite the web 20 on the guide face 14 of the window web 16. In order to avoid unnecessarily limiting the slidability of the profile part 19 but nevertheless to obtain a compact construction, the profile part 19 is provided adjacent to the web 20 with a depression 23 which can engage over the free edge of the side web 21.

In FIG. 2, the contour of the profile part 19 with the recess 18 fits closely directly against the end side of the profile 16 of the frame of the window pane 4. Longitudinal tolerances between the window pane 4, on one hand, the window pane 5, on the other hand, and the arrangement of the window web 6 can thus be easily compensated without deformation of elastic profiles being necessary, by virtue of the adjustability of the width of the window web 6. This is also readily possible even if the window frame 16 were to made of metal or the like and only provided with an elastic layer at, for example, the end side.

The matching can be easily performed by making the profile part 19 abut against the end face of the frame 16 during mounting after insertion of the fixed window pane 4. In this position, it can then be fixed by tightening a screw 24 which engages in a threaded bore or in a threaded sleeve inside the profile part 19 and is guided through an elongated hole 27 in the web part 6a of the window web 6. This elongated hole 27 is arranged in the region of the guide face 14 of the web part 6a parallel to the sliding direction 22. As FIG. 2 also shows, it is possible in this way to achieve a virtually flush arrangement of the outer surfaces of the window panes 4, 5 and of the outer surface of the window web 6. This is aesthetically pleasing and also advantageously manages wind noises during driving.

The screw 24 which is arranged on the inside of the web 6a and faces the passenger compartment can be covered, together with a washer 28, by a cover 26 after mounting and adjustment of the profile part 19. The cover 26 extends over the ends of the inwardly directed wall of the window web 6.

Figure 3:
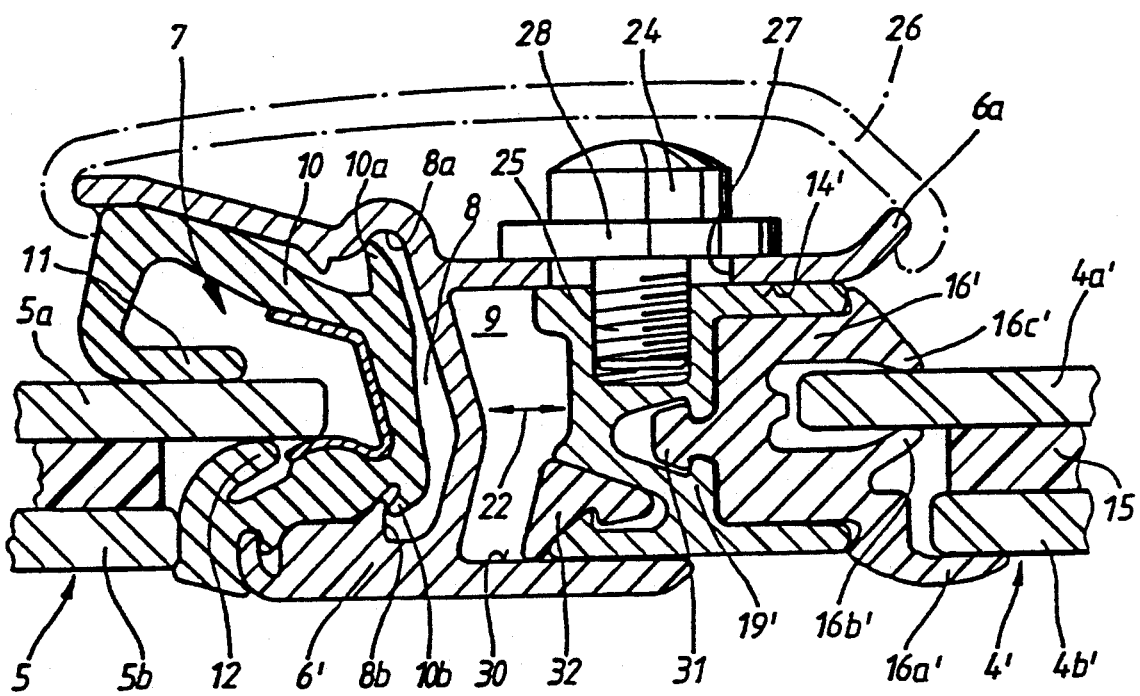
FIG. 3 is a view similar to FIG. 2 but showing another embodiment of the present invention.

FIG. 3 shows another embodiment of the present invention in which the same reference numerals used in FIG. 2 are again employed where they refer to the same parts as in FIG. 2. The window web 6' also consists of an approximately H-shaped profile which has U-shaped recesses 8, 9 on both sides. As in the embodiment of FIG. 2, a rubber U-shaped sealing profile 10 is inserted into the recess 8 and rests against the inner window pane 5a of the insulating glass pane 5. The inserted sealing profile 10 is held in the recess 8. Holding projections 10a, 10b engage in corresponding recesses 8a, 8b of the profile 6'.

In contrast with the embodiment in FIG. 2, the recess 9 of the window web 6' in FIG. 3 is not bounded by a side web 21 but rather has, in addition to the guide face 14' directed towards the inside of the vehicle a stop face 30 which extends parallel to the guide face 14' and forms with the latter the guidance for the profile part 19' provided with the second, fixed insulating glass pane 4'. The two window panes 4a, 4b' of the insulating glass pane 4' are surrounded by a rubber profile 16' with sealing lips 16a', 16b' and 16c'. The profile 16' is held with a dovetail-type type guide 31 in the profile part 19'. Furthermore, seated along the side facing the recess 9 in the profile part 19' is also a sealing strip 32 intended to prevent the ingress of dust or the like into the recess 9.

Otherwise, the design and guidance of the profile part 19' of FIG. 3 in the recess 9 is identical to that in the embodiment of FIG. 2. This also applies to the arrangement of the elongated hole 27 and to the screw 24 which engages through this elongated hole 27 and serves to fix the position of the web part 19'. In contrast with the embodiment of FIG. 2, the insulating glass pane 4' is, therefore, not held in an injection-molded profile but rather in an elastic profile 16' which correspondingly surrounds the window pane parts with lips. However, this embodiment also provides the same advantages with respect to compensation of tolerances.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A side window for a motor vehicle, comprising a fixed window pane, a lowerable window pane, and a window web defining a recess and extending between the fixed and lowerable window panes said window web comprising a window guide profile for the lowerable window pane, a sealing and holding profile for the fixed window pane guided in the recess of the window web, and means for retaining the sealing and holding profile in an adjusted position relative to the window guide profile.

2. The side window according to claim 1, wherein the recess has at least one guide face for guiding a wall part of the sealing and holding profile part.

3. The side window according to claim 2, wherein the at least one guide face is arranged on a side of the recess adjacent an outside surface of the lowerable window pane.

4. The side window according to claim 3, wherein the at least one guide face is a longitudinal groove matched to the dimensions of a web protruding from the profile part and is arranged behind a side web forming termination zone of the recess.

5. The side window according to claim 2, wherein the at least one guide face for the slidable profile part is provided on the side of the recess opposite another guide face.

6. The side window according to claim 2, wherein the at least one guide face has an elongated hole extending in the sliding direction of the profile part and through which a mounting part for the profile part engages.

7. The side window according to claim 6, wherein the mounting part is a screw engaging in a threaded bore of the profile part.

* * * * *